United States Patent
Voto et al.

(10) Patent No.: US 6,441,726 B1
(45) Date of Patent: Aug. 27, 2002

(54) CONFIGURABLE WARNING SYSTEM FOR A VEHICLE INSTRUMENT CLUSTER

(75) Inventors: Andrew Michael Voto, Swartz Creek; Melissa Marie Klemish, Chesaning; Ronald Kenneth Selby, Flint, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/541,563

(22) Filed: Apr. 3, 2000

(51) Int. Cl.⁷ .................................................. B60Q 1/00
(52) U.S. Cl. ...................... 340/438; 340/461; 340/459; 340/525
(58) Field of Search ................................ 340/438, 461, 340/459, 441, 519, 815.45, 525, 462; 345/273, 7, 117

(56) References Cited

U.S. PATENT DOCUMENTS

| | | | | |
|---|---|---|---|---|
| 4,184,146 A | * | 1/1980 | Fratzke | 340/517 |
| 5,293,154 A | * | 3/1994 | Ginzel et al. | 340/438 |
| 5,374,917 A | * | 12/1994 | Hoffman | 340/438 |
| 5,422,625 A | * | 6/1995 | Sakaemura | 340/461 |
| 5,815,072 A | * | 9/1998 | Yamanaka | 340/461 |
| 5,880,710 A | * | 3/1999 | Jaberi | 340/461 |
| 5,949,346 A | * | 9/1999 | Suzuki et al. | 340/815.45 |
| 6,060,985 A | * | 5/2000 | Siviero | 340/461 |

* cited by examiner

Primary Examiner—Anh V. La
(74) Attorney, Agent, or Firm—Jimmy L. Funke

(57) ABSTRACT

In a preferred embodiment, a configurable warning system for a vehicle instrument cluster, including: selection apparatus to select desired characteristics of individual gage elements of the vehicle instrument cluster; illumination apparatus to illuminate the individual gage elements in accordance with selections made by the selection apparatus; and control apparatus operatively connected to the selection apparatus and to the illumination apparatus to receive the selections made by the selection apparatus and to furnish instructions to the illumination apparatus.

22 Claims, 4 Drawing Sheets

CONFIGURABLE WARNING SYSTEM FOR A VEHICLE INSTRUMENT CLUSTER

BACKGROUND OF THE INVENTION

1. Field of the Invention

The present invention relates to vehicle instrument clusters generally and, more particularly, but not by way of limitation, to a novel configurable warning system for a vehicle instrument cluster.

2. Background Art

Vehicle instrument clusters of the type under consideration here are found, for example in automobiles, trucks, watercraft, aircraft, ATVs, and the like. Most, if not all, vehicle instrument clusters include some means of artificial lighting of the elements of the instrument cluster, generally in the form of electrical illumination to provide backlighting of the elements of the instrument cluster. Illumination, of course, is required to permit the operator of a vehicle and others, if necessary, to read in conditions of otherwise low visibility the gages, dials, etc. that are included in the instrument cluster. Such illumination frequently also includes the lighting of warning bands to indicate to the operator of the vehicle that a particular parameter reading, for example, the speedometer, tachometer, or temperature gage reading exceeds a desirable range.

When an indicator, such as a pointer on a gage, enters a warning band area, this conveys to the vehicle operator that there is something wrong with the vehicle and that action should be taken to correct the situation. For example, if the speedometer reading is too high as shown by an indicator needle pointing to a speed in the warning band, that is an indication to the vehicle operator that the speed of the vehicle needs to be reduced. A similar situation exists with a high tachometer reading, for example, and with other vehicle operating parameters. If the engine temperature is too high, there are several possibilities, each one requiring immediate attention.

Such warning bands usually consist of a red area on the graphics applique disposed on the face of the instrument cluster. These warning bands are essentially passive in that they require that the operator of the vehicle notice that the gage pointer indicating the particular parameter has entered the area designated as the warning band. In some cases, an additional telltale, such as the illumination of an icon reinforces the fact that the indicated parameter exceeds the desirable range. As noted above, such an arrangement is essentially passive and also, once the applique graphics have been chosen, there is no practical way to change the length or color of the warning band. The latter may be a special problem with a vehicle operator who has some degree of color blindness, since the vehicle operator's color blindness may cause the vehicle operator to view the color of the warning band as being the same color as the rest of the indicator gage area.

No known illuminated vehicle instrument clusters permit the selective adjustment of the color or the length of the warning band or to permit the selective addition of enhancements to the warning system to more nearly assure that the operator of a vehicle recognizes that a measured parameter is above desirable operation range. Such would increase the safety of the operation of the vehicle and could prevent continued damaging operation of the vehicle.

Accordingly, it is a principal object of the present invention to provide a configurable warning system for a vehicle instrument cluster.

It is a further object of the invention to provide such a configurable warning system that permits the changing of the color of a warning band.

An additional object of the invention is to provide such a configurable warning system that permits the changing of the length of a warning band.

It is another object of the invention to provide such a configurable warning system that permits choosing whether to have the illumination of a warning flash.

It is an additional object of the invention to provide such a configurable warning system that permits manual configuration of the warning system.

It is yet a further object of the invention to provide such a configurable warning system that permits configuration of the warning system by means of audible commands.

It is yet another object of the invention to provide such a configurable warning system that permits selection of further indication of an out-of-range condition by having the color of a pointer or gage area change or flash.

Another object of the invention is to provide such a configurable warning system that permits colors of a warning element to change sequentially as the measured parameter changes.

It is yet an additional object of the invention to provide such a configurable warning system that can be economically implemented in a vehicle instrument cluster.

It is a further object of the invention to provide such a configurable warning system that can transitionally increase the illumination of a dimmed or turned off gage when the parameter indicated by that gage enters a warning zone.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a configurable warning system for a vehicle instrument cluster, comprising: selection means to select desired characteristics of individual gage elements of said vehicle instrument cluster; illumination means to illuminate said individual gage elements in accordance with selections made by said selection means; and control means operatively connected to said selection means and to said illumination means to receive said selections made by said selection means and to furnish instructions to said illumination means.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
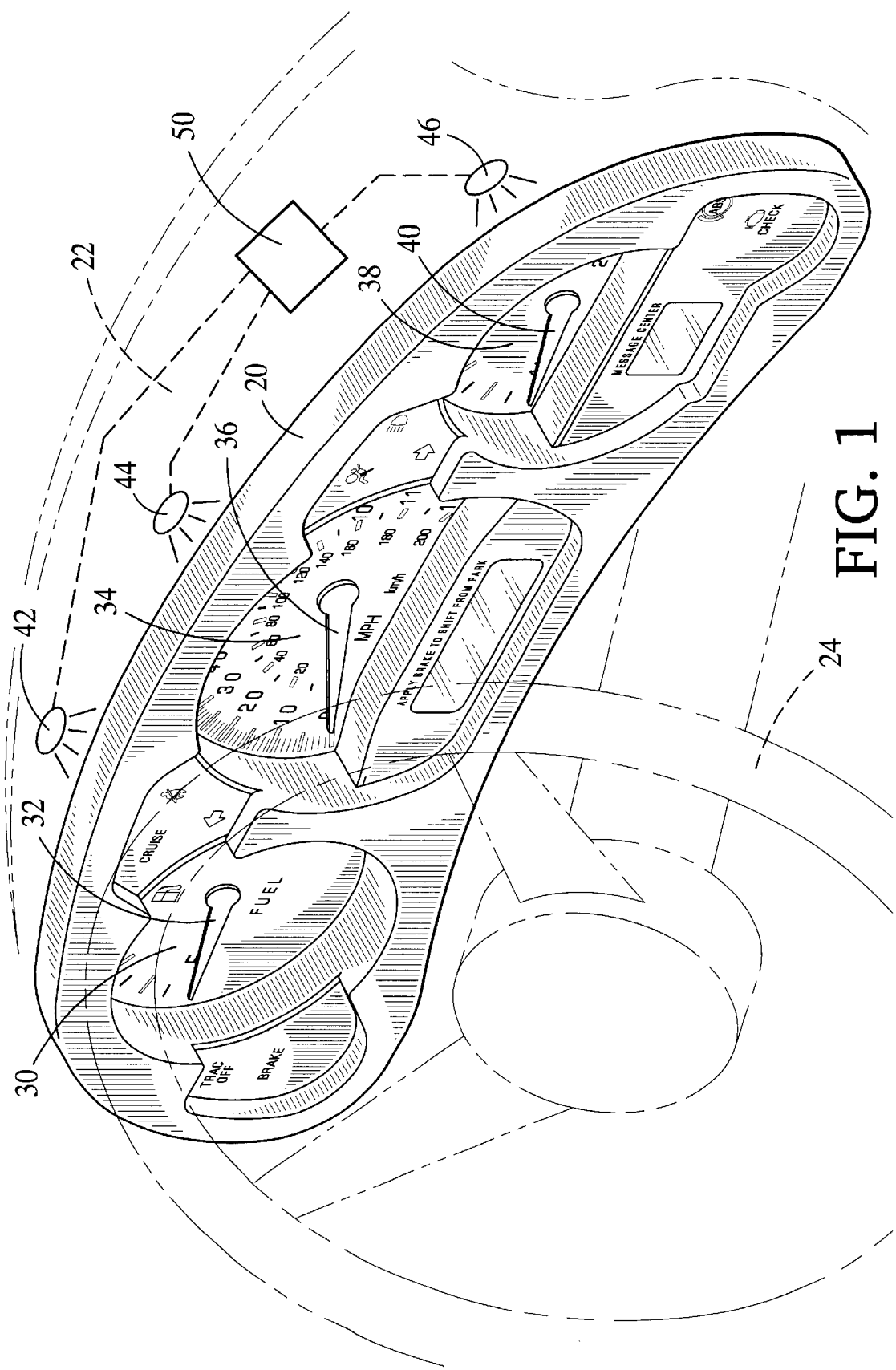
FIG. 1 is a partially schematic isometric view of an example of a vehicle instrument cluster with which the present invention may be employed.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

In general, the present invention provides the ability for operators of a vehicle to select the colors and/or intensities of warning bands, and/or the ranges of the warning bands, and/or whether the colors of the warning bands are to be present in solid or flashing colors, and/or to select the colors of pointers and/or gage areas used in conjunction with the warning bands, and/or to select whether the colors of the pointers and/or gage areas are to be present in solid or flashing colors, and/or whether any of the colors are to change sequentially as the measuring parameter changes.

Whenever herein "color" or "colors" is/are referred to, it will be understood that the lighting elements producing such color or colors, LEDs, for example, may be monochromatic, two-color, or multicolor. It will also be understood that the lighting elements may be chosen such that illumination is visible under both nighttime an daytime lighting conditions.

FIG. 1 illustrates an example of a vehicle instrument cluster 20 with which the present invention may be employed. Vehicle instrument cluster 20 is mounted in a vehicle dashboard 22 behind, or forward of vehicle steers wheel 24. Vehicle instrument cluster 20 includes a fuel gage area 30 with a pointer 32 a speedometer gage area 34 with a pointer 36, and an engine temperature gage area 38 with a pointer 40. Fuel gage area 30 is illuminated by first backlighting illumination means 42, speedometer gage area 34 is illuminated by second backlighting illumination means 44. and engine temperature gage area 38 is illuminated by third backlighting illumination means 46. First, second, and third backlighting illumination means 42 44, and 46 are operatively connected to and under the control of a programmable microprocessor 50. First, second, and third backlighting illumination means 42, 44, and 46 may represent multicolor LEDs, or edge lighting means, or any other type of backlighting illumination means and also may represent separate lighting means for both the gage areas, warning bands (none shown on FIG. 1), and the pointers with which they are associated.

It will be understood that the arrangement of vehicle instrument cluster 20 is provided for illustrative purposes and that a vehicle instrument cluster to which the present invention may be applied may include a greater or fewer number of illuminated areas, pointers, and warning bands. Also, as noted above, pointers and general background of the areas in which the pointers are disposed and also warning bands can have individual backlighting illumination means. There is an unlimited number of variations of pointer, gage area, warning band colors, etc., and whether such colors are solid or flashing or can change sequentially, that can be provided with the present invention and the ones described are for illustrative purposes and are not to be considered a limitation on the present invention.

Figure 2:
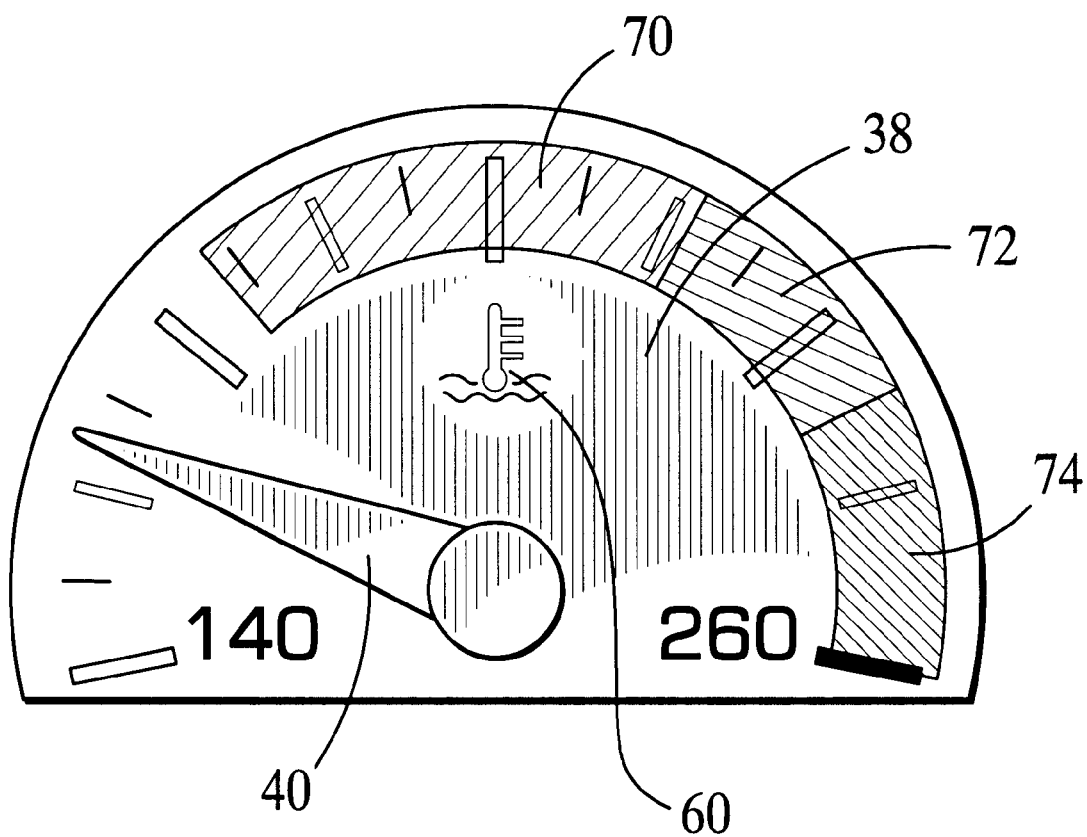
FIG. 2 is a front plan view of a temperature gage employing the present invention.

FIG. 2 illustrates temperature gage area 38 and pointer 40 of instrument cluster 20 (FIG. 1). Disposed on temperature gage area 38 is a conventional icon 60 that is illuminated by an LED or by other means if the temperature of the engine exceeds a predetermined value. Usually, two indicator bands are provided, with one such band indicating that the engine temperature is within a desired operating range and the other such band indicating that the engine temperature is in a range exceeding the desired operating range.

Three indicator bands are shown on FIG. 2, a first band 70 indicating a range of desired operating temperatures, a second band 72 indicating that the desired range of operating temperatures has been exceeded, and a third band 74 indicating that the engine temperature is dangerously high. According to the present invention, the colors of the bands may be set so that band 70 is green, band 72 is yellow, and band 74 is red. Furthermore, according to the present invention, the numbers of the bands may be selectively configured and the ranges of the bands may also be selectively configured. For example, perhaps only one band may be provided, for example, one the total length of bands 70, 72,and 74, but the system can be selectively configured so that the entire band is green when the pointer is in the desired operating range, the entire band is yellow when the pointer is somewhat above the desired operating range, and the entire band is red when the pointer indicates a dangerously high engine temperature. Of course, any other combination of colors may be selected. Additionally, the configurable warning system may be configured such that one or more of the colors is solid or flashing and/or that the illumination of icon 60 is solid or flashing.

Also, the configurable warning system may be configured such that pointer 40 changes color and/or intensity and/or has a solid or flashing color and/or sequentially changing colors as different temperatures are reached. Furthermore, the configurable warning system can be configured such that temperature gage area 38 changes color and/or has a solid or flashing color and/or sequentially changing color as different temperatures are reached. The latter may be provided instead of or in addition to the warning bands described above and may be provided instead of or in addition to having the color of pointer 40 change color or having the color thereof solid or flashing.

Additionally, the configurable warning system may be configured such that the illumination of a warning band or gage area may be transitionally increased. Say, for example, that all illumination of vehicle instrument cluster 20 (FIG. 1) is dimmed or turned off, except for speedometer area 34 and pointer 36. Say, further, that the fuel level starts to enter a warning band. In this case, as the fuel level decreases, the illumination intensity of fuel level gage area 30 and pointer 32 could be increased as the fuel level drops, thus bringing the low fuel level to the attention of the operator of the vehicle.

Other parameters, such as oil pressure and engine speed, can be selectively configured as well.

Configuring of the warning system may be done by the dealer who sells the vehicle, or it may be done by the vehicle operator after delivery of the vehicle, or it may be done by the vehicle dealer and changeable by the vehicle operator, subject to any laws, if any, that may govern the changing of warning indicia such as the changing the range of warning bands. The configuration could also be done by the manufacturer or the dealer to the buyer's specifications.

To configure the warning system, one approach is to simply wait until a gage enters a predefined zone. When it does, the gage, warning band, and/or pointer lighting are adjusted using suitable knobs and/or pushbuttons operatively connected to programmable microprocessor 50 (FIG. 1) to configure the customized warning.

Figure 3:
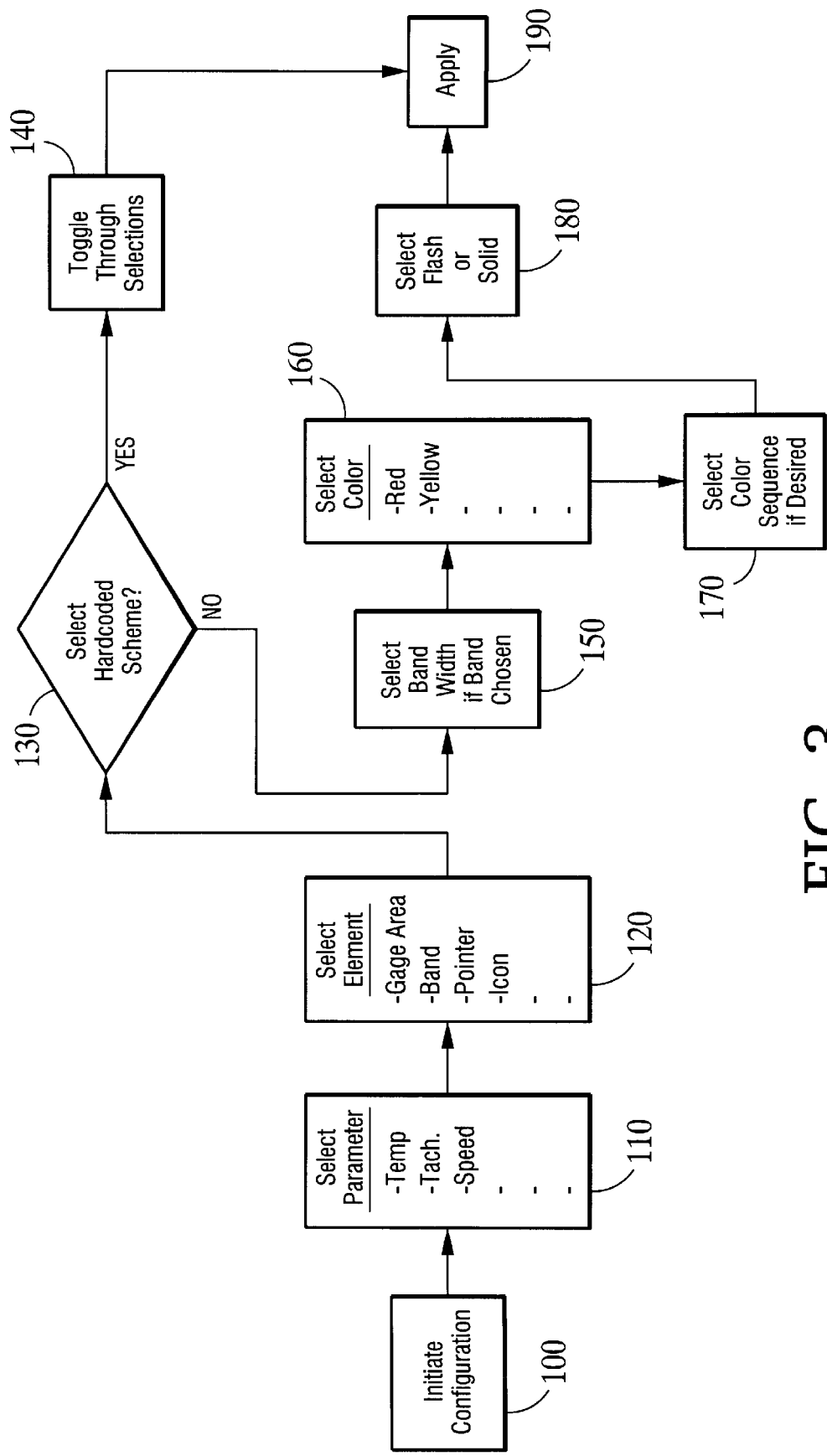
FIG. 3 is a flow diagram showing an example of a programming sequence for the present invention.

Alternatively, suitable knobs and/or pushbuttons can be employed to use the customizing scheme shown on FIG. 3 to program programmable microprocessor 50 (FIG. 1). First, system configuration is initiated at 100. Then, the parameter to be configured is selected at 110. Next, the element to be configured is selected at 120. Following this, one chooses at 130 whether to select a hardcoded warning scheme programmed into programmable microprocessor 50 (FIG. 1). If yes, one toggles through the available selections at 140 and the chosen one is applied at 190. For example, the software may allow the tachometer gage to be constant red, flashing red, constant yellow, or flashing yellow when it is in the warning band and the user would choose one of these predetermined warning schemes which would then be applied.

If one wishes not to choose a hardcoded warning scheme, one would choose the width of the warning band at 150 if the warning band was chosen at 120. Choosing the width of the warning band could consist of turning a knob to whatever position where one wished the band to start. Feedback could be the pointer itself moving to wherever one is setting the band. Alternatively, a digital display could be used for feedback.

Once the width of the warning band is set, if such is chosen, color is selected at 160, a sequence of colors, if desired, is selected at 170, solid or flashing color is selected at 180, and then the selected configuration scheme is applied at 190.

As an alternative to the knobs and pushbuttons contemplated above, voice recognition could be used instead. For example, one could issue the oral command "Instrument cluster, please set Tach warning gage to flashing red".

Figure 4:
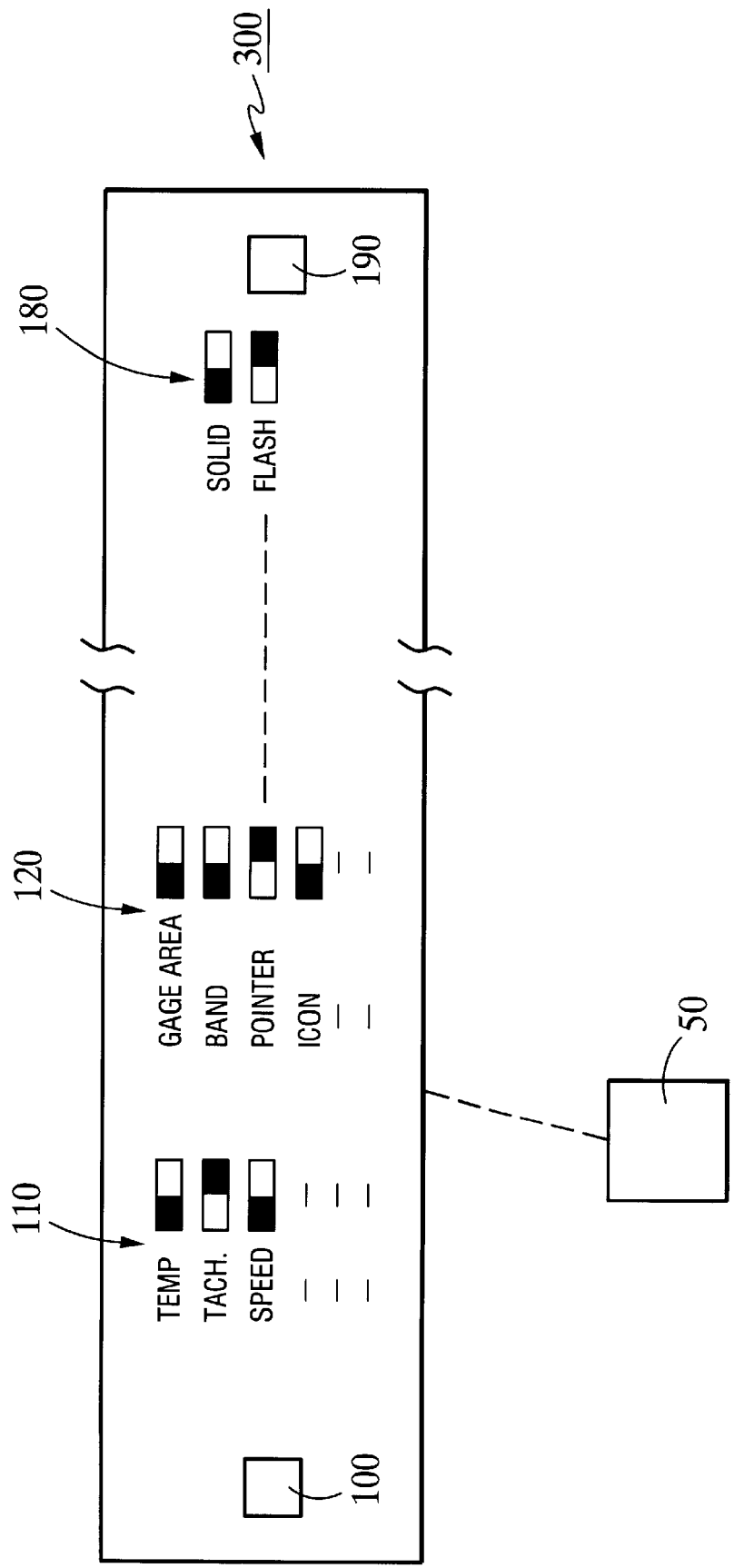
FIG. 4 is a fragmentary, front elevational view of an instrument for programming a programmable microprocessor used in the present invention.

FIG. 4 illustrates an instrument that can be used to program programmable microprocessor 50 (FIG. 1), the instrument being generally indicated by the reference numeral 300. Instrument 300 may be mounted in vehicle dashboard 22 (FIG. 1), for example, or it may be a stand-alone unit that is temporarily operatively attached to programmable microprocessor 50. Instrument 300 includes a plurality of pushbuttons or slide switches, as at 100, to effect programming of programmable microprocessor 50. To initiate configuration, pushbutton 100 is pressed. Then selections are made using others of the pushbuttons or slide switches. In the example shown on FIG. 4, the slide switches have been set so that the tachometer pointer will flash when in a warning zone. Once all selections have been made, pushbutton 190 is pressed to enter the selections in programmable microprocessor 50.

Of course, the configuration scheme shown on FIG. 3 is exemplary and the present invention contemplates that some of the steps described with reference to that figure may be omitted and/or the orders thereof may be changed.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A configurable warning system for a vehicle instrument cluster, comprising:
    (a) selection means to select desired characteristics of individual gage elements of said vehicle instrument cluster;
    (b) illumination means to illuminate said individual gage elements in accordance with selections made by said selection means; and
    (c) control means operatively connected to said selection means and to said illumination means to receive said selections made by said selection means and to furnish instructions to said illumination means.

2. A configurable warning system for a vehicle instrument cluster, as defined in claim 1, wherein: said selection means includes means to select a parameter corresponding to an individual gage.

3. A configurable warning system for a vehicle instrument cluster, as defined in claim 1, where: said selection means includes means to select an individual gage element.

4. A configurable warning system for a vehicle instrument cluster, as defined in claim 1, wherein: said selection means includes means to select a hardcoded warning scheme.

5. A configurable warning system for a vehicle instrument cluster, as defined in claim 1, wherein: said selection means includes means to select a range for a warning band.

6. A configurable warning system for a vehicle instrument cluster, as defined in claim 1, wherein: said selection means includes means to select a color for one of said individual gage elements.

7. A configurable warning system for a vehicle instrument cluster, as defined in claim 1, wherein: said selection means includes means to select a sequence of colors for one of said individual gage elements, said colors to change as a value of a measured parameter changes.

8. A configurable warning system for a vehicle instrument cluster, as defined in claim 1, wherein: said selection means includes means to select whether a color of one of said individual gage elements is to flash or to be solid.

9. A configurable warning system for a vehicle instrument cluster, as defined in claim 1, wherein: said configurable warning system can be configured to provide transitionally increased illumination of an individual gage element.

10. A configurable warning system for a vehicle instrument cluster, as defined in claim 1, wherein: said selection means is responsive to audible commands.

11. A configurable warning system for a vehicle instrument cluster, as defined in claim 1, wherein: said selection means is operable by a user of said vehicle.

12. In combination with a vehicle, a configurable warning system for an instrument cluster disposed in said vehicle, comprising:
    (a) selection means to select desired characteristics of individual gage elements of said vehicle instrument cluster;
    (b) illumination means to illuminate said individual gage elements in accordance with selections made by said selection means; and (c) control means operatively connected to said selection means and to said illumination means to receive said selections made by said selection means and to furnish instructions to said illumination means.

13. A configurable warning system for a vehicle instrument cluster, as defined in claim 12, wherein: said selection means includes means to select a parameter corresponding to an individual gage.

14. A configurable warning system for a vehicle instrument cluster, as defined in claim 12, wherein: said selection means includes means to select an individual gage element.

15. A configurable warning system for a vehicle instrument cluster, as defined in claim 12, wherein: said selection means includes means to select a hardcoded warning scheme.

16. A configurable warning system for a vehicle instrument cluster, as defined in claim 12, wherein: said selection means includes means to select a range for a warning band.

17. A configurable warning system for a vehicle instrument cluster, as defined in claim 12, wherein: said selection means includes means to select a color for one of said individual gage elements.

18. A configurable warning system for a vehicle instrument cluster, as defined in claim 12, wherein: said selection means includes means to select a sequence of colors for one of said individual gage elements, said colors to change as a value of a measured parameter changes.

19. A configurable warning system for a vehicle instrument cluster, as defined in claim 12, wherein: said selection means includes means to select whether a color of one of said individual gage elements is to flash or to be solid.

20. A configurable warning system for a vehicle instrument cluster, as defined in claim 12, wherein: said vehicle instrument cluster can be configured to provide transitionally increased illumination of an individual gage area.

21. A configurable warning system for a vehicle instrument cluster, as defined in claim 12, wherein: said selection means is responsive to audible commands.

22. A configurable warning system for a vehicle instrument cluster, as defined in claim 12, wherein: said selection means is operable by a user of said vehicle.

* * * * *